United States Patent [19]
Baxter, Jr.

[11] Patent Number: 5,996,758
[45] Date of Patent: Dec. 7, 1999

[54] ELECTROMAGNETICALLY CONTROLLED BI-DIRECTIONAL ONE-WAY CLUTCH APPARATUS

[75] Inventor: Ralph W. Baxter, Jr., Fort Wayne, Ind.

[73] Assignee: Dana Corporation, Toledo, Ohio

[21] Appl. No.: 09/005,179

[22] Filed: Jan. 9, 1998

[51] Int. Cl.⁶ .................................................. F16D 27/01
[52] U.S. Cl. ................................. 192/84.31; 192/84.92; 192/43.1
[58] Field of Search ............................. 192/84.3, 84.31, 192/84.92, 43.1

[56] References Cited

U.S. PATENT DOCUMENTS

| | | | |
|---|---|---|---|
| Re. 33,742 | 11/1991 | Blessing et al. | 475/150 |
| 2,784,820 | 3/1957 | Clark | 192/43 |
| 2,844,743 | 7/1958 | Watson | 310/37 |
| 2,866,109 | 12/1958 | Watson | 310/37 |
| 3,249,185 | 5/1966 | Moorhead | 192/43.1 |
| 3,801,033 | 4/1974 | Sanderson | 242/571.6 |
| 3,831,692 | 8/1974 | Fry | 180/14 R |
| 3,907,083 | 9/1975 | Nieder | 192/35 |
| 4,222,473 | 9/1980 | Kopich | 192/43.1 |
| 4,781,078 | 11/1988 | Blessing et al. | 74/711 |
| 5,025,902 | 6/1991 | Imai et al. | 192/43 |
| 5,070,978 | 12/1991 | Pires | 192/45.1 |
| 5,135,086 | 8/1992 | Ciolli | 192/48.3 |
| 5,159,522 | 10/1992 | Gray | 361/154 |
| 5,199,325 | 4/1993 | Reuter et al. | 74/861 |
| 5,503,261 | 4/1996 | Schultz | 192/105 CD |
| 5,518,094 | 5/1996 | Myrick | 192/45.1 |
| 5,551,262 | 9/1996 | Seo | 68/23.7 |

Primary Examiner—Rodney H. Bonck
Assistant Examiner—Saul Rodriguez
Attorney, Agent, or Firm—Oldham & Oldham Co., L.P.A.

[57] ABSTRACT

An electromagnetically controlled bi-directional one-way clutch apparatus which permits relative overrun or differentiation between a front torque transmitting shaft and a rear torque transmitting shaft up to a predetermined level and, if the amount of relative overrun or differentiation between the front torque transmitting shaft and the rear torque transmitting shaft exceeds this predetermined level, locks the front torque transmitting shaft and the rear torque transmitting shaft together such that the front torque transmitting shaft and the rear torque transmitting shaft rotate at substantially the same rotational speed. This electromagnetically controlled bi-directional one-way clutch apparatus is particularly useful for use in an "on demand" four-wheel drive system for a motor vehicle having an engine and a front wheel drive transaxle assembly where the electromagnetically controlled bi-directional one-way clutch apparatus acts as a torque transmitting device which allows relative overrun or differentiation between the front wheels and the rear wheels of the motor vehicle up to a predetermined level and, if the amount of relative overrun or differentiation between the front wheels and the rear wheels of the motor vehicle exceeds this predetermined level, locks the front wheels and the rear wheels of the motor vehicle together such that the front wheels and the rear wheels of the motor vehicle rotates at substantially the same rotational speed.

20 Claims, 3 Drawing Sheets

ELECTROMAGNETICALLY CONTROLLED BI-DIRECTIONAL ONE-WAY CLUTCH APPARATUS

BACKGROUND AND SUMMARY OF THE INVENTION

The present invention relates generally to a new and novel electromagnetically controlled bi-directional one-way clutch apparatus. More particularly, the present invention relates to a new and novel electromagnetically controlled bi-directional one-way clutch apparatus which is enabled to transmit or cut-off both clockwise and counterclockwise rotation at the input side and can be used, for example, as an "on-demand" torque transmitting device in a part-time four-wheel drive motor vehicle to provide an arrangement for limiting more than a predetermined amount of overrun or differentiation between the front wheels and the rear wheels of a motor vehicle. The electromagnetically controlled bi-directional one-way clutch apparatus in accordance with the present invention allows relative overrun or differentiation between the front wheels and the rear wheels of the motor vehicle up to a predetermined threshold and, thereafter, precludes such relative overrun or differentiation so a portion of the torque being provided to the axle with slipping wheels is redirected and transmitted to the axle with non-slipping wheels.

Four-wheel drive motor vehicles are becoming increasingly popular. Recently, certain motor vehicles have been provided with "full-time" four-wheel drive systems. In such "full-time" four-wheel drive systems, the torque transfer cases are typically provided with an interaxle differential for dividing torque between the front wheels and the rear wheels of the motor vehicle. The interaxle differential enables the front wheels and the rear wheels to rotate at different speeds, which occurs during normal turning of the motor vehicle or in the event that the front wheels and the rear wheels have tires with different diameters. However, to prevent excessive relative slipping between the front wheels and the rear wheels, as might occur when one set of wheels encounters a low-traction condition, such as ice, these transfer cases typically include a selectively engageable clutch which is operative to lock the interaxle differential upon sensing a predetermined amount of relative slippage between the front output shaft and the rear output shaft of the transfer case. Locking of the interaxle differential prevents any further relative overrun or differentiation between the front output shaft and the rear output shaft of the transfer case.

Known prior "full-time" four-wheel drive systems have generally required complex electronic sensors or other complex systems to monitor the overrun or differentiation between the front output shaft and the rear output shaft or the front wheels and the rear wheels of a motor vehicle. Upon sensing relative overrun or differentiation, an electronic control system determines whether the relative overrun or differentiation being encountered is within a "normal" expected range or is "excessive." If the electronic control system indicates that the overrun or differentiation being experienced is "excessive," the electronic control system causes the selectively engageable clutch to lock the interaxle differential to preclude any further relative overrun or differentiation. An electronic control system of this type can be expensive to manufacture and maintain and a more cost-effective, simplified "on demand" system of limiting more than a predetermined amount of overrun or differentiation between the front wheels and the rear wheels of the motor vehicle would be desirable.

A preferred embodiment of the present invention is, therefore, directed to an electromagnetically controlled bi-directional one-way clutch apparatus which permits relative overrun or differentiation between a front torque transmitting shaft and a rear torque transmitting shaft up to a predetermined level and, if the amount of relative overrun or differentiation between the front torque transmitting shaft and the rear torque transmitting shaft exceeds this predetermined level, locks the front torque transmitting shaft and the rear torque transmitting shaft together such that the front torque transmitting shaft and the rear torque transmitting shaft rotate at substantially the same rotational speed. This electromagnetically controlled bi-directional one-way clutch apparatus is particularly useful for use in an "on demand" four-wheel drive system for a motor vehicle having an engine and a front wheel drive transaxle assembly where the electromagnetically controlled bi-directional one-way clutch acts as a torque transmitting device which allows relative overrun or differentiation between the front wheels and the rear wheels of the motor vehicle up to a predetermined level and, if the amount of relative overrun or differentiation between the front wheels and the rear wheels of the motor vehicle exceeds this predetermined level, locks the front wheels and the rear wheels of the motor vehicle together such that the front wheels and the rear wheels of the motor vehicle rotate at substantially the same rotational speed. The electromagnetically controlled bi-directional one-way clutch apparatus preferably includes a first torque transmitting shaft coupled to the transmission or transaxle assembly such that the first torque transmitting shaft is rotatably driven by the transmission or transaxle assembly and transmits torque to the front axle of the motor vehicle and a second torque transmitting shaft which is rotatably coupled to the rear axle of the motor vehicle. If the rotational speed of the front wheels overrides the rotational speed of the rear wheels by less than a predetermined amount, say 20%, electromagnetically controlled bi-directional one-way clutch apparatus does not engage and relative overrun or differentiation between the front wheels and the rear wheels is permitted. However, if the rotational speed of the front wheels overrides the rotational speed of the rear wheels by more than the predetermined amount, for example, when the front wheels of the motor vehicle are on ice, snow, mud or some other slippery surface, electromagnetically controlled bi-directional one-way clutch apparatus locks the front wheels and the rear wheels of the motor vehicle together to transmit a portion of the torque being provided to the excessively overrunning or differentiating front wheels to the rear wheels and cause the front wheels and the rear wheels to rotate together at substantially the same rotational speed.

Accordingly, the present invention provides an arrangement for permitting a first torque transmitting shaft to overrun or differentiate up to a predetermined amount in relation to a second torque transmitting shaft, but when the first torque transmitting shaft overruns or differentiates greater than this predetermined amount in relation to the second torque transmitting shaft, the electromagnetically controlled bi-directional one-way clutch apparatus locks the first torque transmitting shaft and the second torque transmitting shaft together to rotate at substantially the same rotational speed.

In addition, the electromagnetically controlled bi-directional one-way clutch apparatus in accordance with the present invention enables transmission or cut-off of both clockwise and counterclockwise rotation at the input side. The electromagnetically controlled bi-directional one-way clutch apparatus in accordance with the present invention is also capable of engaging or disengaging auxiliary driving wheels to switch back and forth between two-wheel drive and four-wheel drive during vehicle operation. In this regard, the electromagnetically controlled bi-directional one-way clutch apparatus may be used in a transfer case which provides power for the auxiliary driving wheels.

In fact, the electromagnetically controlled bi-directional one-way clutch apparatus in accordance with the present invention is useful in any arrangement where the speeds of the driving member and the driven member are nearly synchronous and multiple modes of operation are desired. For example, the electromagnetically controlled bi-directional one-way clutch apparatus in accordance with the present invention can completely disengage the auxiliary driving wheels for two-wheel drive for normal highway vehicle operations, positively lock the auxiliary driving wheels for four-wheel drive for low speed, off-highway vehicle operations or automatically engage the auxiliary driving wheels in response to vehicle operating conditions, such as slippage of the primary drive wheels. In addition, the electromagnetically controlled bi-directional one-way clutch apparatus in accordance with the present invention provides for easy and gentle transition between its operational modes.

Other advantages and novel features of the present invention will become apparent in the following detailed description of the invention when considered in conjunction with the accompanying drawings.

DETAILED DESCRIPTION OF THE DRAWINGS

Figure 1:
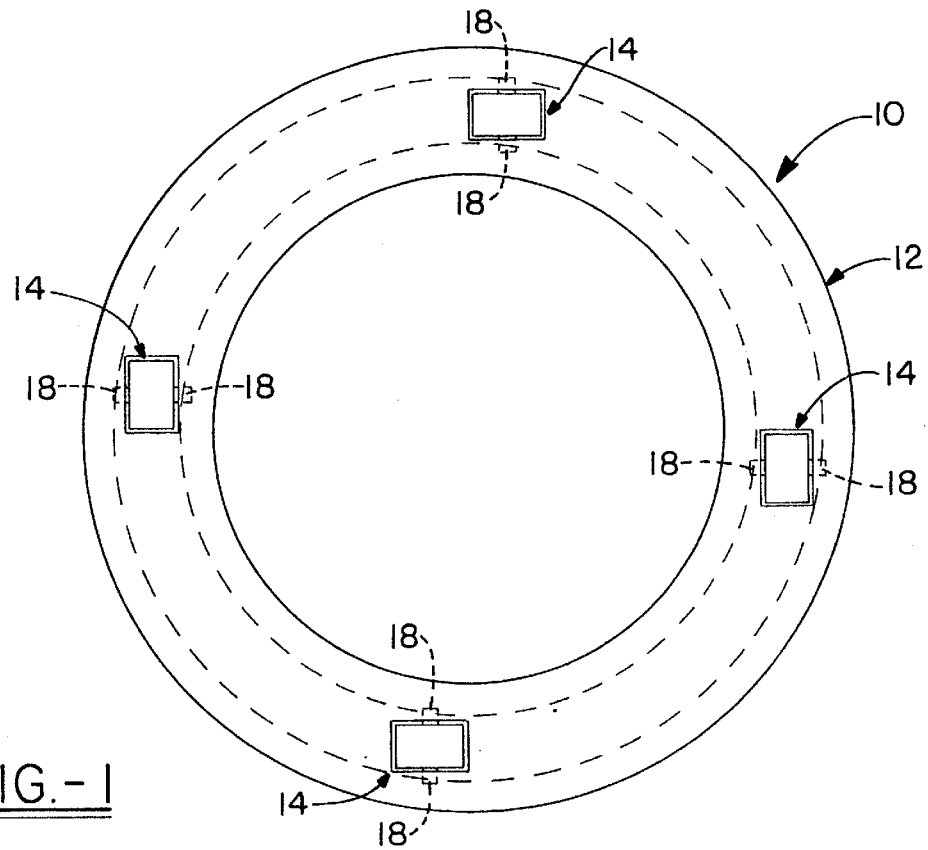
FIG. 1 is a top view of an electromagnetically controlled bi-directional one-way clutch apparatus in accordance with a preferred embodiment of the present invention.
Figure 2:
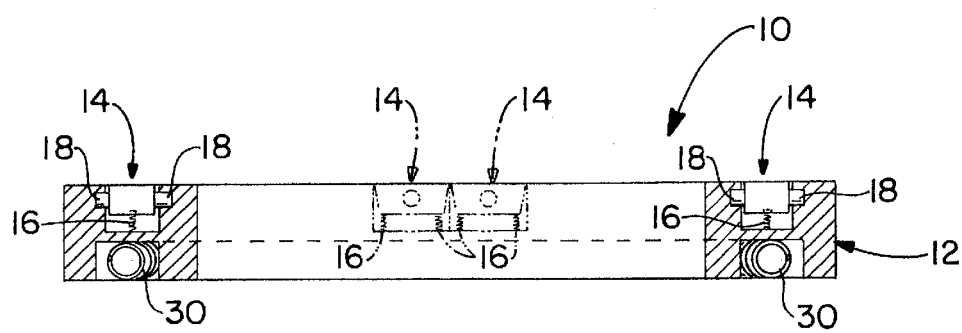
FIG. 2 is a cross-sectional side view of the electromagnetically controlled bi-directional one-way clutch apparatus in accordance with the preferred embodiment of the present invention shown in FIG. 1.
Figure 5:
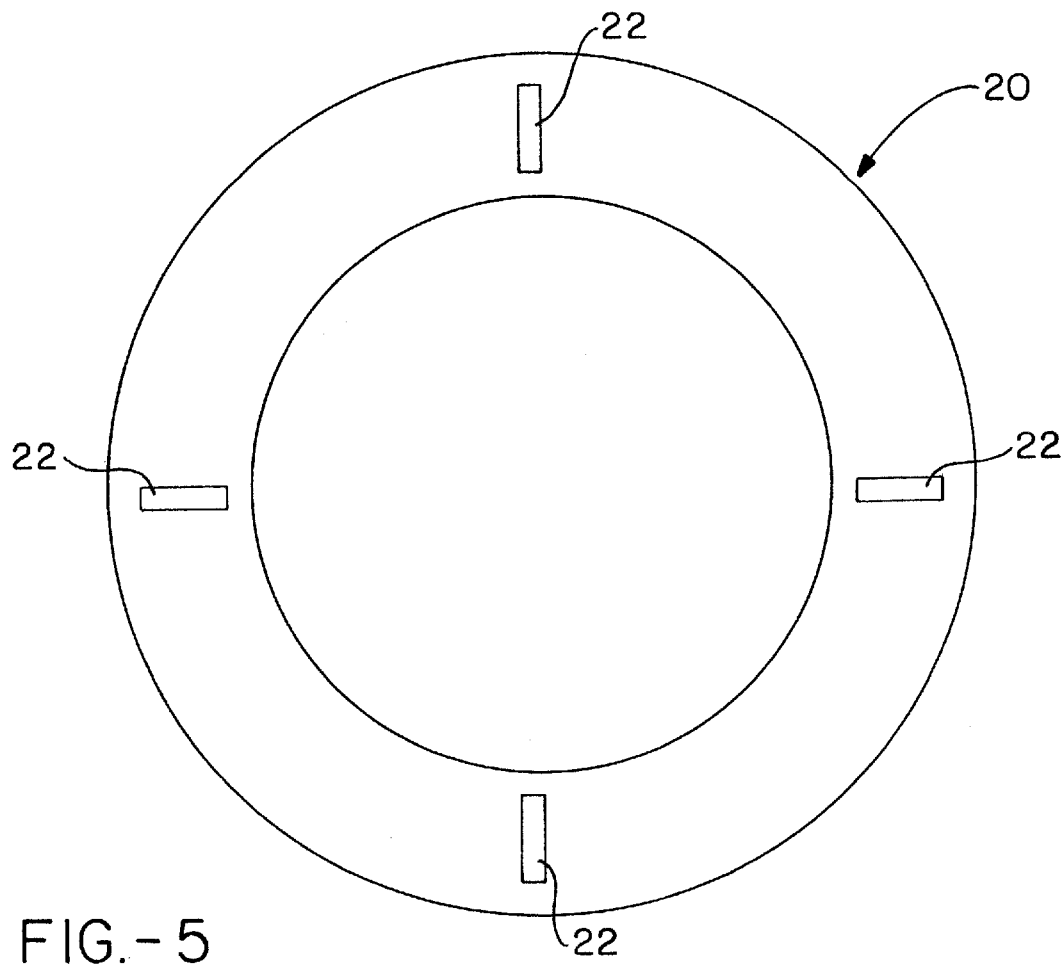
FIG. 5 is a top view of a reactive/mating member for the electromagnetically controlled bi-directional one-way clutch apparatus in accordance with the preferred embodiment of the present invention shown in FIG. 1.
Figure 6:
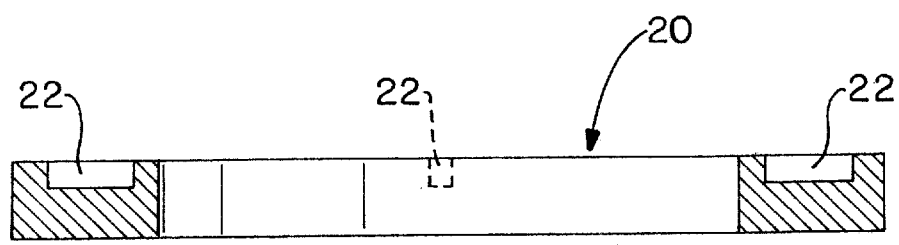
FIG. 6 a cross-sectional side view of the reactive/mating member shown in FIG. 5 for the electromagnetically controlled bi-directional one-way clutch apparatus in accordance with the preferred embodiment of the present invention shown in FIG. 1.
Figure 7:
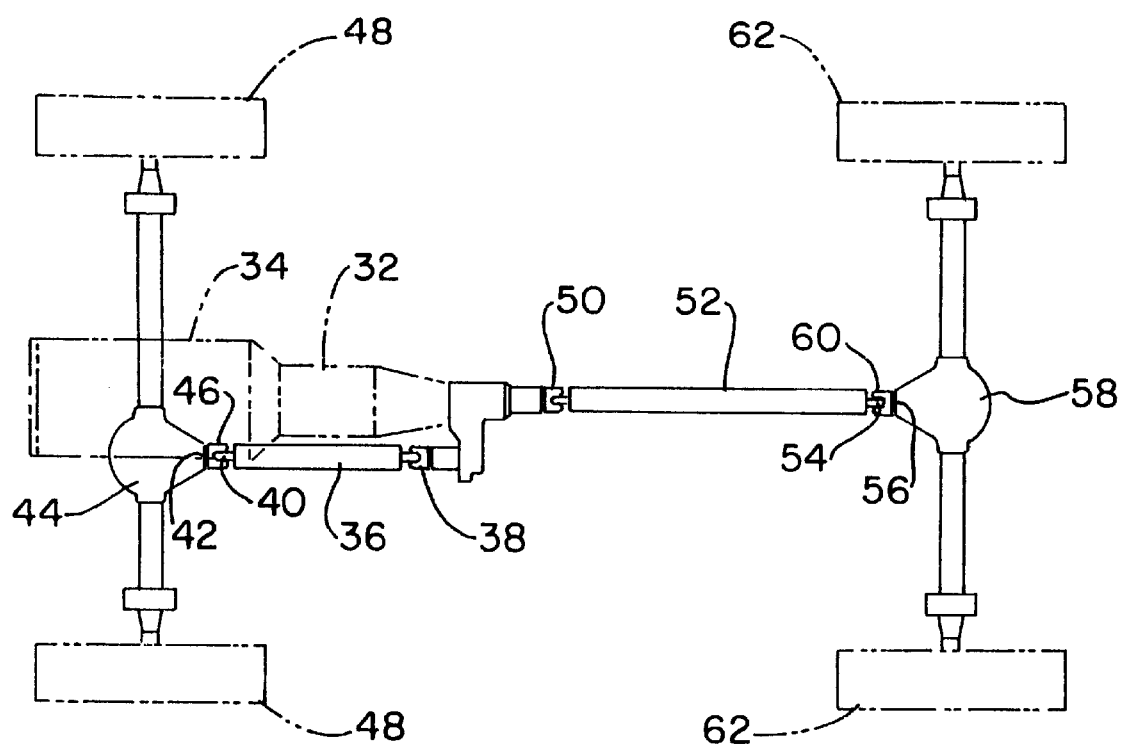
FIG. 7 is a top plan schematic view of a motor vehicle having a four-wheel drive system with a torque transfer case in accordance with the preferred embodiment of the present invention shown in FIG. 1.

In the following detailed description of a preferred embodiment of the present invention, reference is made to the accompanying drawings which, in conjunction with this detailed description, illustrate and describe a preferred embodiment of an electromagnetically controlled bi-directional one-way clutch apparatus, generally identified by reference number 10, in accordance with the present invention. Referring now to the drawings, in which like-referenced characters indicate corresponding elements throughout the several views, attention is first directed to FIGS. 1 and 2, which is a top view and a cross-sectional side view, respectively, of electromagnetically controlled bi-directional one-way clutch apparatus 10 in accordance with a preferred embodiment of the present invention. Referring also to FIG. 7, which is a top plan schematic view of a motor vehicle having a four-wheel drive system with a torque transfer case in accordance with the preferred embodiment of the present invention shown in FIG. 1 electromagnetically controlled bi-directional one-way clutch apparatus 10 apparatus is preferably coupled with motor vehicle transaxle or transmission assembly 32 of conventional design which, in turn, is coupled to motor vehicle drive engine 34 also preferably of conventional design. Electromagnetically controlled bi-directional one-way clutch apparatus 10 generally includes clutch plate 12 having one or more clutch struts 14, four (4) in the preferred embodiment of electromagnetically controlled bi-directional one-way clutch apparatus 10 shown in FIGS. 1 and 2, which are balanced on springs 16 about central pivot pin 18 and is preferably connected to the rearward end of a motor vehicle front axle drive shaft 36 via universal joint coupling 38 of conventional design. Forward end 40 of motor vehicle front axle drive shaft 36 is coupled to input shaft or yoke 42 of motor vehicle front differential unit 44 via universal joint coupling 46 of conventional design. Motor vehicle front differential unit 44 is adapted to divide torque from motor vehicle front axle drive shaft 36 to front wheels 50 of the motor vehicle. Electromagnetically controlled bi-directional one-way clutch apparatus 10 also includes reactive/mating member 20 which, referring to FIGS. 5 and 6, includes one or more clutch strut receiving pockets 22, four (4) in the preferred embodiment of reactive/mating member 20 shown in FIGS. 5 and 6, which preferably correspond with clutch struts 14, and is preferably drivingly connected to forward end 50 of motor vehicle rear axle drive shaft 52 of conventional design. Motor vehicle rear axle drive shaft 54 has rearward end 56 connected to input shaft or yoke 58 of motor vehicle rear differential unit (not shown) via universal joint coupling 60 of conventional design. Motor vehicle rear differential unit 58 is adapted to divide torque received from motor vehicle rear axle drive shaft 52 between rear wheels 62 of the motor vehicle.

Figure 3:
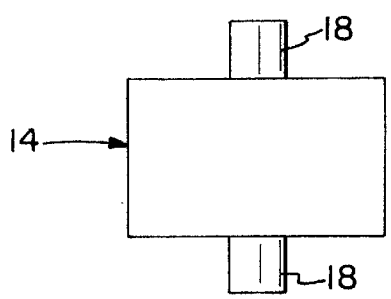
FIG. 3 is a top view of a clutch strut for the electromagnetically controlled bi-directional one-way clutch apparatus in accordance with the preferred embodiment of the present invention shown in FIG. 1.
Figure 4:
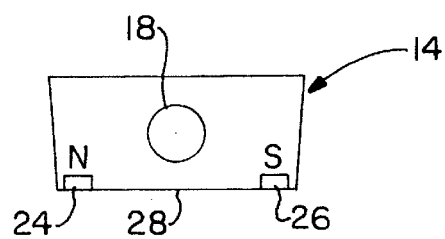
FIG. 4 is a front view of the clutch strut shown in FIG. 3 for the electromagnetically controlled bi-directional one-way clutch apparatus in accordance with the preferred embodiment of the present invention shown in FIG. 1.

As seen in FIGS. 3 and 4, clutch struts 14 preferably include magnets 24 and 26, most preferably permanent magnets, mounted in lower surface 28 thereof. When electric current coil 30 is energized, clutch struts 14 pivot according to the involved magnetic polarities allowing clutch struts 14 to activate electromagnetically controlled bi-directional one-way clutch apparatus 10 in a first rotational direction. By reversing the direction of current flowing through electric current coil 30, clutch struts 14 are made to pivot in the opposite direction and electromagnetically controlled bi-directional one-way clutch apparatus 10 is activated to work in a second rotational direction opposite to the first rotational direction.

Thus, electromagnetically controlled bi-directional one-way clutch apparatus 10 is selectively operational in both a first rotational direction, as well as in a second rotational direction opposite to that of the first rotational direction. By electromagnetically actuating electromagnetically controlled bi-directional one way clutch apparatus 10, one could control the rotational direction in which electromagnetically controlled bi-directional one way clutch apparatus 10 would work, limit the speed that electromagnetically controlled bi-directional one way clutch apparatus 10 will work in and make electromagnetically controlled bi-directional one way clutch apparatus 10 automatic by incorporating sensors and computer controls.

Electromagnetically controlled bi-directional one way clutch apparatus 10 has numerous applications in motor vehicle differentials and transfer cases. For example, electromagnetically controlled bi-directional one way clutch apparatus 10 could be controlled such that when a motor vehicle is in a forward drive gear, clutch struts 14 are pivoted to a first operational position and when the motor vehicle is put in a reverse drive gear, clutch struts 14 are pivoted to the second operational position. Application of electrical current to electric current coil 30 and the direction of flow of electrical current through electric current coil 30 could be controlled by sensors designed to detect motor vehicle wheel slippage. In addition, electromagnetically controlled bi-directional one way clutch apparatus 10 could be designed to be energized (in either direction) only above or below a predetermined motor vehicle speed. In general, magnets 24 and 26 permit electromagnetically controlled bi-directional one way clutch apparatus 10 to be controlled and placed in a first operational position, a second operational position or disengaged as desired.

Although the present invention has been described above in detail, the same is by way of illustration and example only and is not to be taken as a limitation on the present invention. For example, the number and arrangement of clutch struts 14 could be readily changed in electromagnetically controlled bi-directional one-way clutch apparatus 10 using the teachings of the present invention. Accordingly, the scope and content of the present invention are to be defined only by the terms of the appended claims.

What is claimed is:

1. An electromagnetically controlled bi-directional one-way clutch apparatus for selectively coupling a first rotating member to a second rotating member, said electromagnetically controlled bi-directional one way clutch apparatus comprising:

at least one clutch strut connected to said first rotating member and pivotable between a first operative position and a second operative position, said at least one clutch strut including at least one permanent magnet as a part thereof;

an electric current coil for establishing a magnetic field adjacent to said at least one clutch strut, said magnetic field having either a positive polarity or a negative polarity depending upon the direction of electrical current traveling through said electric current coil, whereby said at least one clutch strut is pivoted to said first operative position when said magnetic field of said electric current coil is positive and said clutch strut is pivoted to said second operative position when said magnetic field of said electric current coil is negative;

a reaction member coupled to said second rotating member for selectively engaging said at least one clutch strut; and whereby when said at least one clutch strut is in said first operative position, said reaction member engages said at least one clutch strut when said first rotating member overruns said second rotating member by more than a predetermined amount and when said at least one clutch strut is in said second operative position, said reaction member engages said at least one clutch strut when said second rotating member overruns said first rotating member by more than a predetermined amount.

2. The electromagnetically controlled bi-directional one-way clutch apparatus in accordance with claim 1, wherein said at least one clutch strut is balanced on a first spring and a second spring.

3. The electromagnetically controlled bi-directional one-way clutch apparatus in accordance with claim 1, wherein said at least one clutch strut is balanced on a first spring and a second spring and includes a central pivot pin positioned therebetween.

4. The electromagnetically controlled bi-directional one-way clutch apparatus in accordance with claim 1, wherein said at least one permanent magnet is mounted on a lower surface of said at least one clutch strut.

5. The electromagnetically controlled bi-directional one-way clutch apparatus in accordance with claim 1, wherein said at least one clutch strut includes a total of four (4) clutch struts positioned about the circumference of said electromagnetically controlled bi-directional one-way clutch apparatus.

6. The electromagnetically controlled bi-directional one-way clutch apparatus in accordance with claim 1, wherein said at least one clutch strut includes a total of four (4) clutch struts substantially equidistantly positioned about the circumference of said electromagnetically controlled bi-directional one-way clutch apparatus.

7. The electromagnetically controlled bi-directional one-way clutch apparatus in accordance with claim 6, wherein each of said four (4) clutch struts are balanced on a first spring and a second spring and include a central pivot pin positioned therebetween.

8. The electromagnetically controlled bi-directional one-way clutch apparatus in accordance with claim 7, wherein said at least one permanent magnet is mounted on a lower surface of each of said four (4) clutch struts.

9. A transfer case for a motor vehicle having an electromagnetically controlled bi-directional one-way clutch apparatus for selectively coupling one of a front motor vehicle axle and a rear motor vehicle axle with the other of a front motor vehicle axle and a rear motor vehicle axle, said electromagnetically controlled bi-directional one way clutch apparatus comprising:

at least one clutch strut connected to one of said front motor vehicle axle and said rear motor vehicle axle and pivotable between a first operative position and a second operative position, said at least one clutch strut including at least one permanent magnet as a part thereof;

an electric current coil for establishing a magnetic field adjacent to said at least one clutch strut, said magnetic field having either a positive polarity or a negative polarity depending upon the direction of electrical current traveling through said electric current coil, whereby said at least one clutch strut is pivoted to said first operative position when said magnetic field of said electric current coil is positive and said clutch strut is pivoted to said second operative position when said magnetic field of said electric current coil is negative;

a reaction member coupled to the other of said front motor vehicle axle and said rear motor vehicle axle for selectively engaging said at least one clutch strut; and whereby when said at least one clutch strut is in said first operative position, said reaction member engages said at least one clutch strut when said front motor vehicle axle or said rear motor vehicle axle overruns the other of said front motor vehicle axle and said rear motor vehicle axle by more than a predetermined amount and when said at least one clutch strut is in said second operative position, said reaction member engages said at least one clutch strut when the other of said front motor vehicle axle and said rear motor vehicle axle overruns said front motor vehicle axle and said rear motor vehicle axle by more than a predetermined amount.

10. The transfer case for a motor vehicle having an electromagnetically controlled bi-directional one-way clutch apparatus in accordance with claim 9, wherein said at least one clutch strut is balanced on a first spring and a second spring and includes a central pivot pin positioned therebetween.

11. The transfer case for a motor vehicle having an electromagnetically controlled bi-directional one-way clutch apparatus in accordance with claim 9, wherein said at least one permanent magnet is mounted on a lower surface of said at least one clutch strut.

12. The transfer case for a motor vehicle having an electromagnetically controlled bi-directional one-way clutch apparatus in accordance with claim 9, wherein said at least one clutch strut includes a total of four (4) clutch struts positioned about the circumference of said electromagnetically controlled bi-directional one-way clutch apparatus.

13. The transfer case for a motor vehicle having an electromagnetically controlled bi-directional one-way clutch apparatus in accordance with claim 9, wherein said at least one clutch strut includes a total of four (4) clutch struts substantially equidistantly positioned about the circumference of said electromagnetically controlled bi-directional one-way clutch apparatus.

14. The transfer case for a motor vehicle having an electromagnetically controlled bi-directional one-way clutch apparatus in accordance with claim 13, wherein each of said four (4) clutch struts are balanced on a first spring and a second spring and include a central pivot pin positioned therebetween.

15. The transfer case for a motor vehicle having an electromagnetically controlled bi-directional one-way clutch apparatus in accordance with claim 14, wherein said at least one permanent magnet is mounted on a lower surface of each of said four (4) clutch struts.

16. A motor vehicle axle assembly for a motor vehicle having an electromagnetically controlled bi-directional one-way clutch apparatus for selectively coupling one of a left motor vehicle half axle and a right motor vehicle half axle with the other of said left motor vehicle half axle and said right motor vehicle half axle, said electromagnetically controlled bi-directional one way clutch apparatus comprising:

at least one clutch strut connected to one of said left motor vehicle half axle and said right motor vehicle half axle and pivotable between a first operative position and a second operative position, said at least one clutch strut including at least one permanent magnet as a part thereof;

an electric current coil for establishing a magnetic field adjacent to said at least one clutch strut, said magnetic field having either a positive polarity or a negative polarity depending upon the direction of electrical current traveling through said electric current coil, whereby said at least one clutch strut is pivoted to said first operative position when said magnetic field of said electric current coil is positive and said clutch strut is pivoted to said second operative position when said magnetic field of said electric current coil is negative;

a reaction member coupled to the other of said left motor vehicle half axle and said right motor vehicle half axle for selectively engaging said at least one clutch strut; and whereby when said at least one clutch strut is in said first operative position, said reaction member engages said at least one clutch strut when one of said left motor vehicle half axle and said right motor vehicle half axle overruns the other of said left motor vehicle half axle and said right motor vehicle half axle by more than a predetermined amount and when said at least one clutch strut is in said second operative position, said reaction member engages said at least one clutch strut when the other of said left motor vehicle half axle and said right motor vehicle half axle overruns one of said left motor vehicle half axle and said right motor vehicle half axle by more than a predetermined amount.

17. The motor vehicle axle assembly having an electromagnetically controlled bi-directional one-way clutch apparatus in accordance with claim 16, wherein said at least one clutch strut is balanced on a first spring and a second spring and includes a central pivot pin positioned therebetween.

18. The motor vehicle axle assembly having an electromagnetically controlled bi-directional one-way clutch apparatus in accordance with claim 16, wherein said at least one permanent magnet is mounted on a lower surface of said at least one clutch strut.

19. The motor vehicle axle assembly having an electromagnetically controlled bi-directional one-way clutch apparatus in accordance with claim 16, wherein said at least one clutch strut includes a total of four (4) clutch struts substantially equidistantly positioned about the circumference of said electromagnetically controlled bi-directional one-way clutch apparatus.

20. The motor vehicle axle assembly having an electromagnetically controlled bi-directional one-way clutch apparatus in accordance with claim 19, wherein each of said four (4) clutch struts are balanced on a first spring and a second spring and include a central pivot pin positioned therebetween and said at least one permanent magnet is mounted on a lower surface of each of said four (4) clutch struts.

* * * * *